US007864165B2

(12) United States Patent
Weh et al.

(10) Patent No.: US 7,864,165 B2
(45) Date of Patent: Jan. 4, 2011

(54) APPARATUS AND METHOD FOR DETECTING POSITION, AND TOUCH PANEL USING THE SAME

(75) Inventors: Shang Tai Weh, Zhonghe (TW); Teng-Wei Hsieh, Zhonghe (TW)

(73) Assignee: Egalax Empia Technology Inc., Taipei (TW)

( * ) Notice: Subject to any disclaimer, the term of this patent is extended or adjusted under 35 U.S.C. 154(b) by 867 days.

(21) Appl. No.: 11/753,237

(22) Filed: May 24, 2007

(65) Prior Publication Data

US 2008/0056068 A1    Mar. 6, 2008

(30) Foreign Application Priority Data

Aug. 31, 2006    (TW) .............................. 95132248 A (51) Int. Cl.
*G01S 3/80*    (2006.01)
(52) U.S. Cl. ...................................... 345/175; 345/178
(58) Field of Classification Search ......... 345/173–178; 178/18.01–18.09
See application file for complete search history.

(56) References Cited

U.S. PATENT DOCUMENTS

2004/0212603 A1*  10/2004  Cok ............................ 345/175
2005/0248540 A1*  11/2005  Newton ....................... 345/173
2006/0227120 A1*  10/2006  Eikman ....................... 345/175

FOREIGN PATENT DOCUMENTS

TW                 225614        6/1992

* cited by examiner

*Primary Examiner*—Amr Awad
*Assistant Examiner*—Tony Davis
(74) *Attorney, Agent, or Firm*—Snell & Wilmer L.L.P.

(57) ABSTRACT

An apparatus and a method for detecting position, and a touch panel using the same are provided. The apparatus for detecting position includes a frame, a plurality of first signal sources, a plurality of first signal receivers, a plurality of second signal sources, a plurality of second signal receivers, and a processor. The frame is comprised of a first portion, a second portion, a third portion, and a fourth portion. The plurality of first signal sources are disposed along the first and the second portions to emit the signals configured to detect a coordinate in a first direction. The plurality of first signal receivers are disposed along the third and the fourth portions, corresponding to the plurality of first signal sources, to receive the signals from the plurality of first signal sources respectively. The plurality of second signal sources are disposed along the first and the fourth portions to emit the signals configured to detect a coordinate in a second direction. The plurality of second signal receivers are disposed along the second and the third portions, corresponding to the plurality of second signal sources, to receive the signals from the plurality of second signal sources respectively. When an object is set in a particular position within the frame, the processor, coupled with the plurality of first and second signal receivers, determines the particular position of the object according to the locations of signal receivers and strength variation of their received signals.

32 Claims, 10 Drawing Sheets

APPARATUS AND METHOD FOR DETECTING POSITION, AND TOUCH PANEL USING THE SAME

CROSS REFERENCE TO RELATED APPLICATIONS

This application claims priority to Taiwan Patent Application No. 095132248 entitled "Apparatus and Method for Detecting Position, and Touch Panel Using The Same," filed on Aug. 31, 2006.

TECHNICAL FIELD

The present invention relates to an apparatus and a method for detecting position, and more particularly, to an apparatus and a method for detecting position applied to touch panels of arbitrary shapes.

BACKGROUND OF THE INVENTION

The touch panel may be classified into resistance type touch panel, capacitance type touch panel, ultrasonic type touch panel, and infrared type touch panel, etc., according to work principles. Take the capacitance type touch panel as an example. Its major process includes the step of depositing an antimony tin oxide (ATO) film and silver paste wires on the glass. The capacitance type touch panel benefits from high stability, good transmittance, and high surface hardness, but its cost is high and its process is complicated. As for the resistance type touch panel, it is mainly made of an indium tin oxide (ITO) conductive film and an indium tin oxide conductive glass. The resistance type touch panel benefits from lower cost and simpler structure, but has inferior transmittance and surface hardness to the capacitance type touch panel. The ultrasonic type touch panel obtains coordinate of a certain position by emitting ultrasonic wave and computing the strength of the received signal. The infrared type touch panel works on the light barring principle. Infrared emitting and receiving devices are disposed on the periphery of the panel, and the light signal would be barred when an object touches the panel. The coordinates of the object could be obtained by analyzing the signal received by the receiving device.

Figure 1:
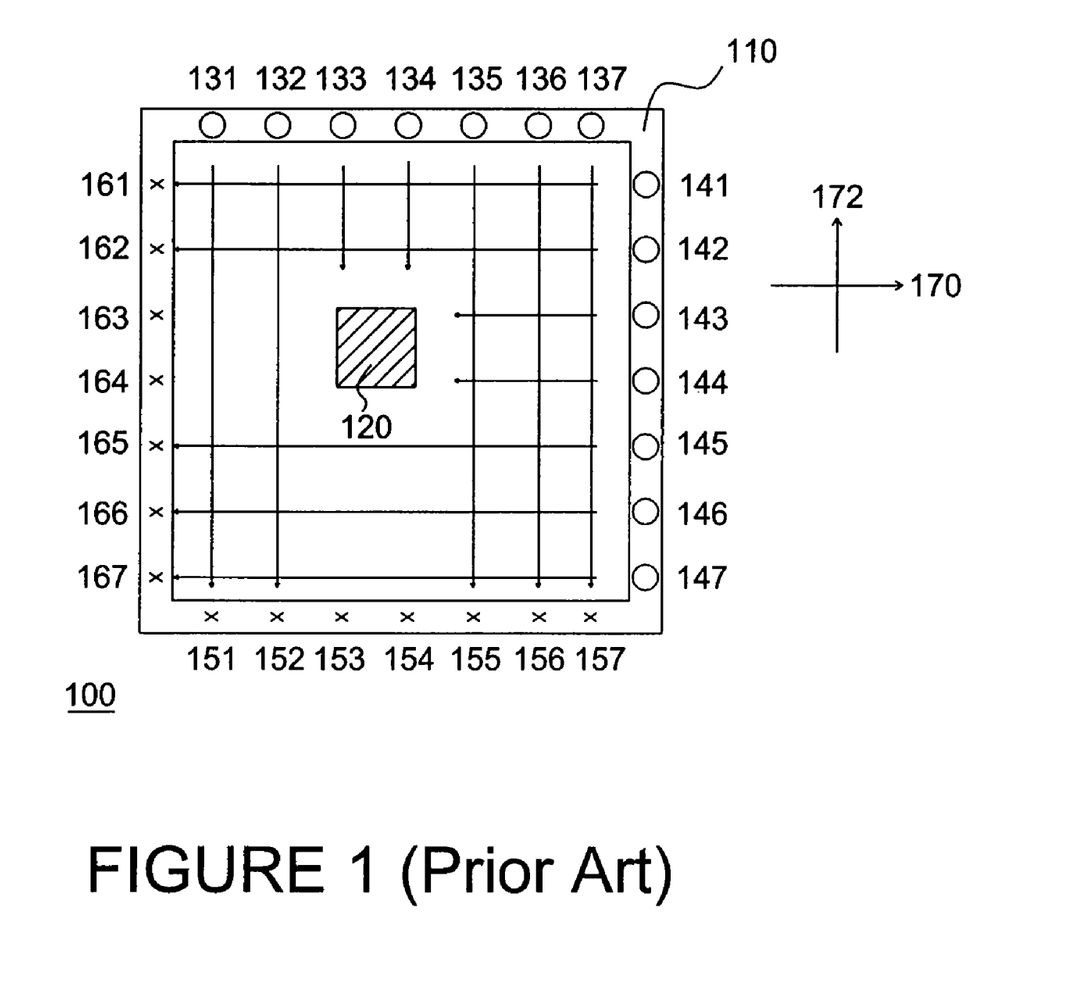
FIG. 1 shows a known apparatus for detecting position applied in an infrared type touch pane

FIG. 1 shows a known apparatus 100 for detecting position applied in an infrared type touch pane. The apparatus 100 includes a rectangular frame 110, infrared sources 131-137 and 141-147, and light receivers 151-157 and 161-167. The light receivers 151-157 are configured to receive light emitted from the infrared sources 131-137 respectively, and the light receivers 161-167 are configured to receive light emitted from the infrared sources 141-147 respectively. When a finger or other object 120 is set in a certain position within the frame 110, the light receivers 163 and 164 cannot receive light from the light sources 143 and 144, and the light receivers 153 and 154 cannot receive light from the light sources 133 and 134. The x-coordinate of the object 120 within the frame 110 can be determined by the locations of the light receivers 153 and 154, and the y-coordinate of the object 120 within the frame 110 can be determined by the locations of the light receivers 163 and 164.

In the apparatus 100 shown in FIG. 1, the light sources are disposed on the two edges of the rectangle which are perpendicular to each other, and the corresponding light receivers are disposed on the remaining two edges for detecting the coordinate of the object within the frame. However, the configuration of the apparatus 100 shown in FIG. 1 is only suitable for the rectangular frames, but not suitable for the frames of shapes other than rectangle, such as circle or other irregular shapes.

Consequently, it is necessary to provide an apparatus for detecting the position of objects on the panel, which can be applied to panels of arbitrary shapes.

SUMMARY OF THE INVENTION

In light of the problems of the prior art, the present invention provides an apparatus, which can be applied to panels of arbitrary shapes, for detecting position.

According to one aspect of the present invention, an apparatus for detecting position is provided to implement a touch panel. The apparatus for detecting position includes a frame, a plurality of first signal sources, a plurality of first signal receivers, a plurality of second signal sources, a plurality of second signal receivers, and a processor. The frame comprises a first portion, a second portion, a third portion, and a fourth portion. The plurality of first signal sources are disposed along the first and the second portions to emit the signals configured to detect a coordinate in a first direction. The plurality of first signal receivers are disposed along the third and the fourth portions, corresponding to the plurality of first signal sources, to receive the signals from the plurality of first signal sources respectively. The plurality of second signal sources are disposed along the first and the fourth portions to emit the signals configured to detect a coordinate in a second direction. The plurality of second signal receivers are disposed along the second and the third portions, corresponding to the plurality of second signal sources, to receive the signals from the plurality of second signal sources respectively. When an object is set in a particular position within the frame for selecting a certain image shown on the panel, the processor, coupled with the plurality of first and second signal receivers, determines the particular position of the object according to the locations of the first and second signal receivers and strength variation of signals received by the first and the second receivers, and further determines which image is selected.

According to another aspect of the present invention, a touch panel including a screen, an apparatus for detecting position, and a processor is provided. The processor constructs the corresponding relations between the positions of images shown on the screen and the positions within the frame. The apparatus is disposed on the display and includes a frame, a plurality of first signal sources, a plurality of first signal receivers, a plurality of second signal sources, and a plurality of second signal receivers. The frame comprises a first portion, a second portion, a third portion, and a fourth portion. The plurality of first signal sources are disposed along the first and the second portions to emit the signals configured to detect a coordinate in a first direction. The plurality of first signal receivers are coupled to the processor and disposed along the third and the fourth portions, corresponding to the plurality of first signal sources, to receive the signals from the plurality of first signal sources respectively. The plurality of second signal sources are disposed along the first and the fourth portions to emit the signals configured to detect a coordinate in a second direction. The plurality of second signal receivers are coupled to the processor and disposed along the second and the third portions, corresponding to the plurality of second signal sources, to receive the signals from the plurality of second signal sources respectively. When an object is set in a particular position within the frame, the processor determines the particular position of the object according to the locations of the first and the second signal receivers and strength variation of signals received by the first and the second signal receivers.

According to still another aspect of the present invention, a method for determining a particular position of an object within a frame is provided. The frame comprises a first portion, a second portion, a third portion, and a fourth portion. The method includes the following steps: disposing a plurality of first signal sources along the first and the second portions to emit the signals configured to detect a coordinate in a first direction; disposing a plurality of first signal receivers along the third and the fourth portions to receive the signals from the plurality of first signal sources respectively; disposing a plurality of second signal sources along the first and the fourth portions to emit the signals configured to detect a coordinate in a second direction; disposing a plurality of second signal receivers along the second and the third portions to receive the signals from the plurality of second signal sources respectively; and determining the particular position of the object according to the locations of the first and the second signal receivers and strength variation of signals received by the first and the second signal receivers.

Other aspects of the present invention would be stated and easily understood through the following description of the embodiments of the present invention. The aspects of the present invention would be appreciated and implemented by the elements and their combinations pointed out in the appended claims. It should be understood that the above summary of the invention and the following detailed description are only illustrative, and do not limit the present invention.

BRIEF DESCRIPTION OF THE DRAWINGS

The drawings are employed to illustrate the embodiments and the principles of the present invention in conjunction with the description. However, it should be understood that the present invention is not limited to the shown configurations and elements, in which.

DETAILED DESCRIPTION OF THE PREFERRED EMBODIMENTS

An apparatus for detecting position and a method of making the same, which are capable of implementing touch panels of arbitrary shapes, are disclosed. The objects, embodiments, features and advantages of the present invention will be more apparent by referring to the following description of the preferred embodiments and FIGS. 2A-7. However, the apparatuses, elements, and steps of the method described in the following embodiments are intended to illustrate the present invention, and not to limit the scope of the invention.

Figure 2A:
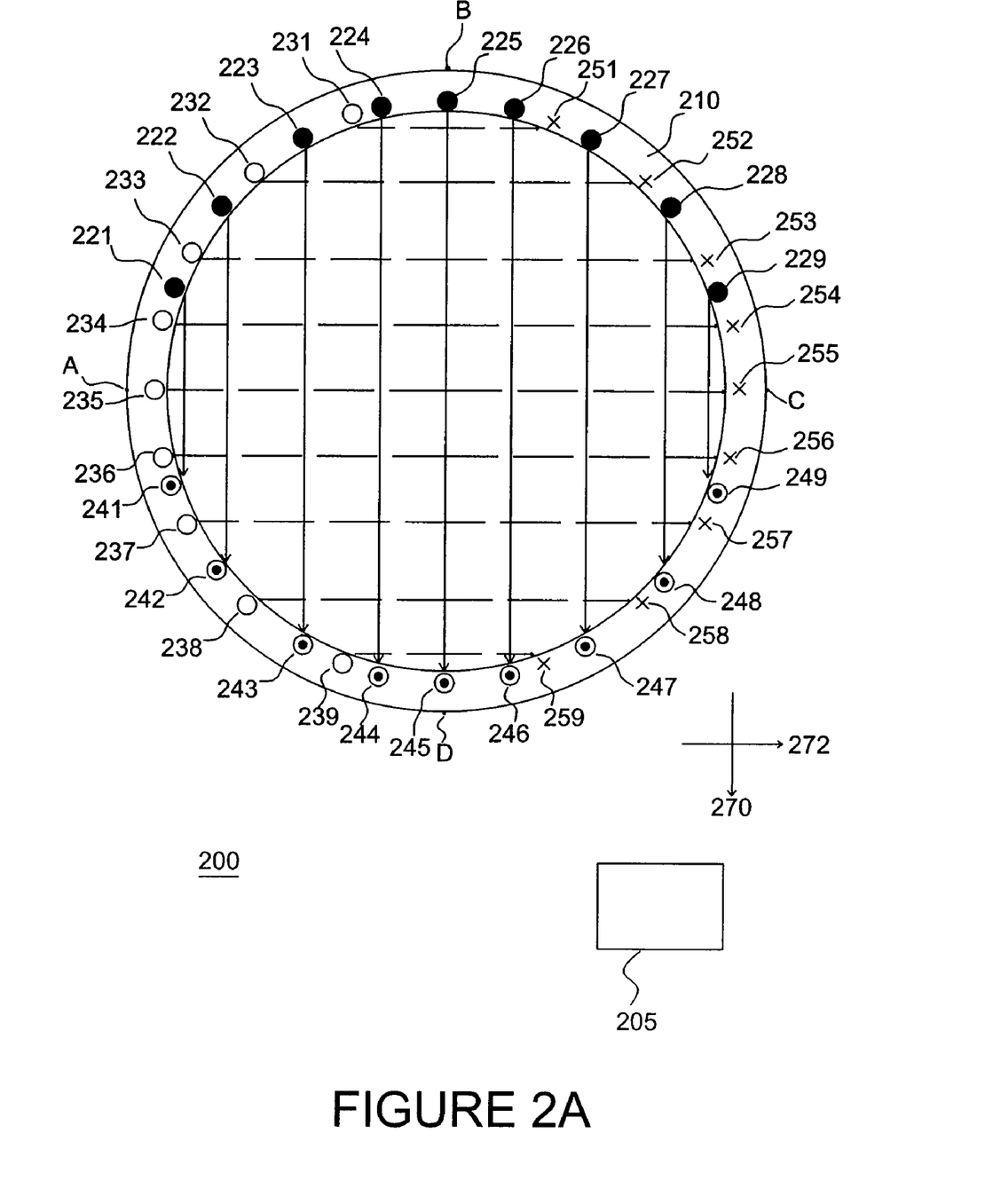
FIG. 2A is a schematic diagram showing an apparatus for detecting position according to one embodiment of the present invention.

FIG. 2A is a schematic diagram showing an apparatus 200 for detecting position according to the present invention. The apparatus 200 includes a processor 205, a circular frame 210, a first set of signal sources 221-229, a second set of signal sources 231-239, a first set of signal receivers 241-249, and a second set of signal receivers 251-259. The frame 210 may be divided into four portions by the four points A, B, C, and D, namely, a first portion from point A to point B, a second portion from point B to point C, a third portion from point C to point D, and a fourth portion from point D to point A in a clockwise direction. The first set of signal sources 221-229 is disposed along the first and the second portions, and the first set of signal receivers 241-249 is disposed along the third and the fourth portions and corresponding to the first set of signal sources 221-229. The second set of signal sources 231-239 is disposed along the first and the fourth portions, and the second set of signal receivers 251-259 is disposed along the second and the third portions and corresponding to the second set of signal sources 231-239. As shown in FIG. 2A, a portion of the first set of signal sources 221-225 and a portion of the second set of signal sources 231-235 are interposed among each other at the first portion, in which the number of signal sources and how they are interposed depend on the resolution requirement of the apparatus 200. Generally speaking, the more the signal sources there are, the higher the resolution is. The number of the signal sources and signal receivers in FIG. 2A are only illustrative, which can vary with applications.

Figure 2B:
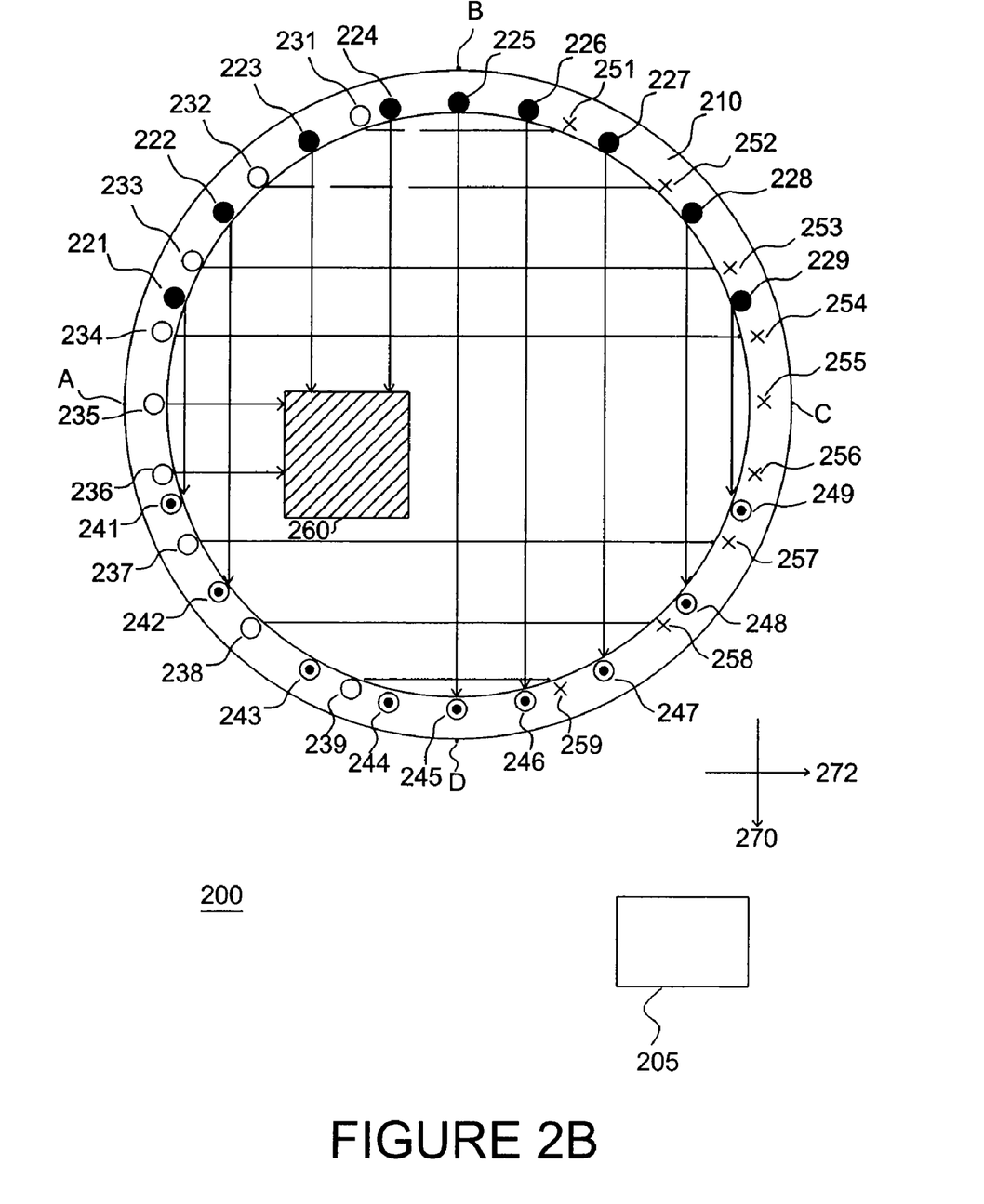
FIG. 2B is a schematic diagram showing the operation of the apparatus for detecting position.

The first set of signal sources 221-229 and the second set of signal sources 231-239 are configured to emit directional signals, and these directional signals are received by the first set of signal receivers 241-249 and the second set of signal receivers 251-259 respectively. The first set of signal sources 221-229 emits signals in a first direction 270 to detect a coordinate in a second direction 272 perpendicular to the first direction 270. The second set of signal sources 231-239 emits signals in the second direction 272 to detect a coordinate in the first direction 270. The processor 205 can obtain the coordinates in the second direction 272 and the first direction 270 of the object in the frame 210 according to the signals received by the first set of signal receivers 241-249 and the second set of signal receivers 251-259 respectively. FIG. 2B is a schematic diagram depicting the operation of the apparatus 200 shown in FIG. 2A. When an object 260, such as a finger, is placed at a certain position within the frame 210, the signals emitted from the signal sources 223, 224 and 235, 236 will be blocked, and these signals will not be received by the signal receivers 243, 244 and 255, 256. The processor 205 can detect that the strengths of the signals received by the signal receivers 243, 244, 255, and 256 are decreased, and then determine the position of the object 260 within the frame 210 according to the intersections of the two sets of lines which are formed between signal receivers 243, 244, 255, and 256 and their corresponding signal sources 223, 224, 235, and 236 respectively.

The processor 205 is coupled to the first set of signal receivers 241-249 and the second set of signal receivers 251-259 indirectly for analyzing the strength of signal received by each receiver and then computing a particular position of an object within the frame 210. The formation of the two sets of lines and their intersections shown in FIG. 2A may be obtained through a particular algorithm performed by the processor 205. According to practical applications, the processor 205 may work in conjunction with an A/D converter or other known circuits to process the received signals.

Figure 3A:
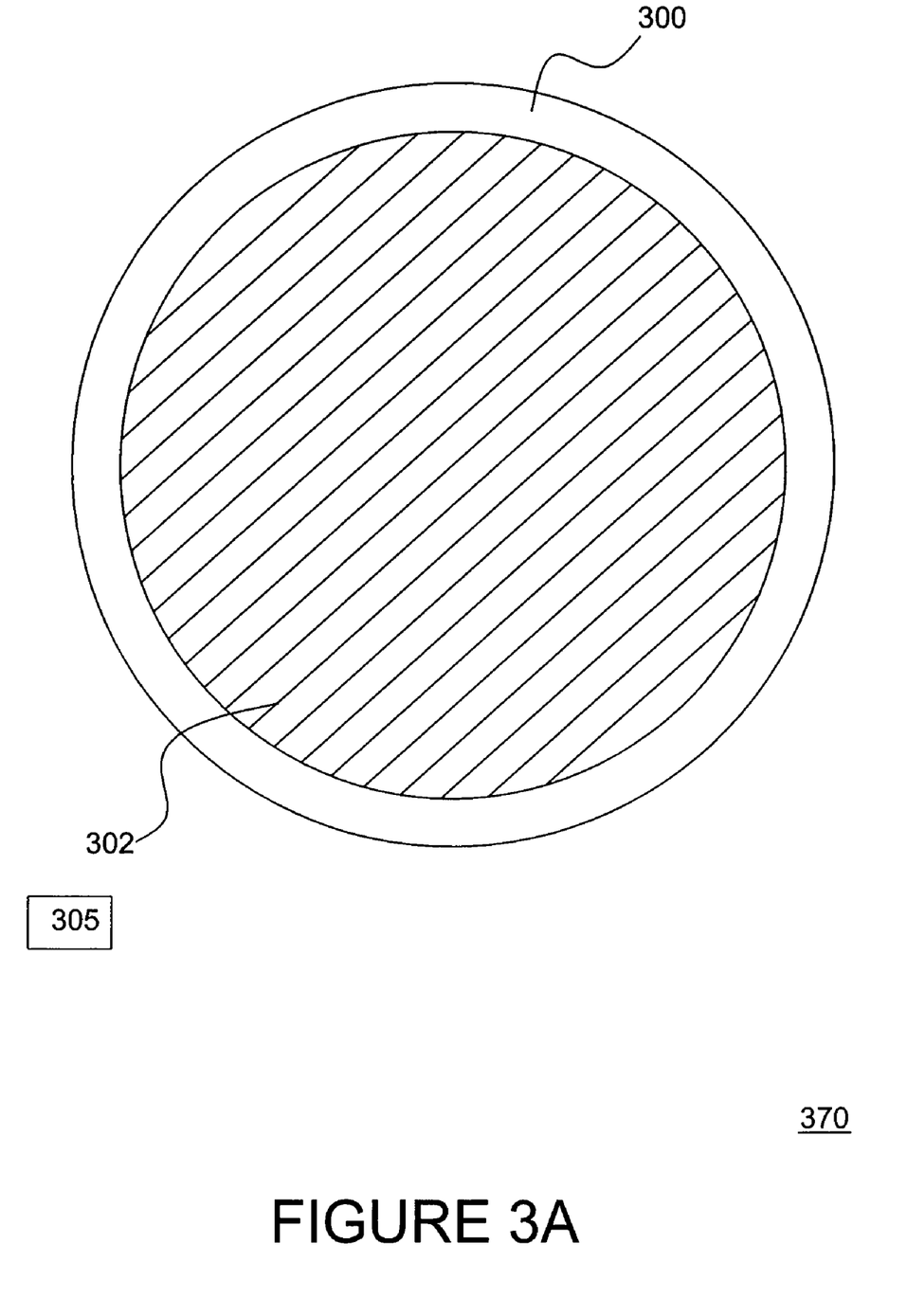
FIG. 3A is a schematic diagram showing an apparatus for detecting position arranged with a circular screen according to one preferred embodiment of the present invention.
Figure 3B:
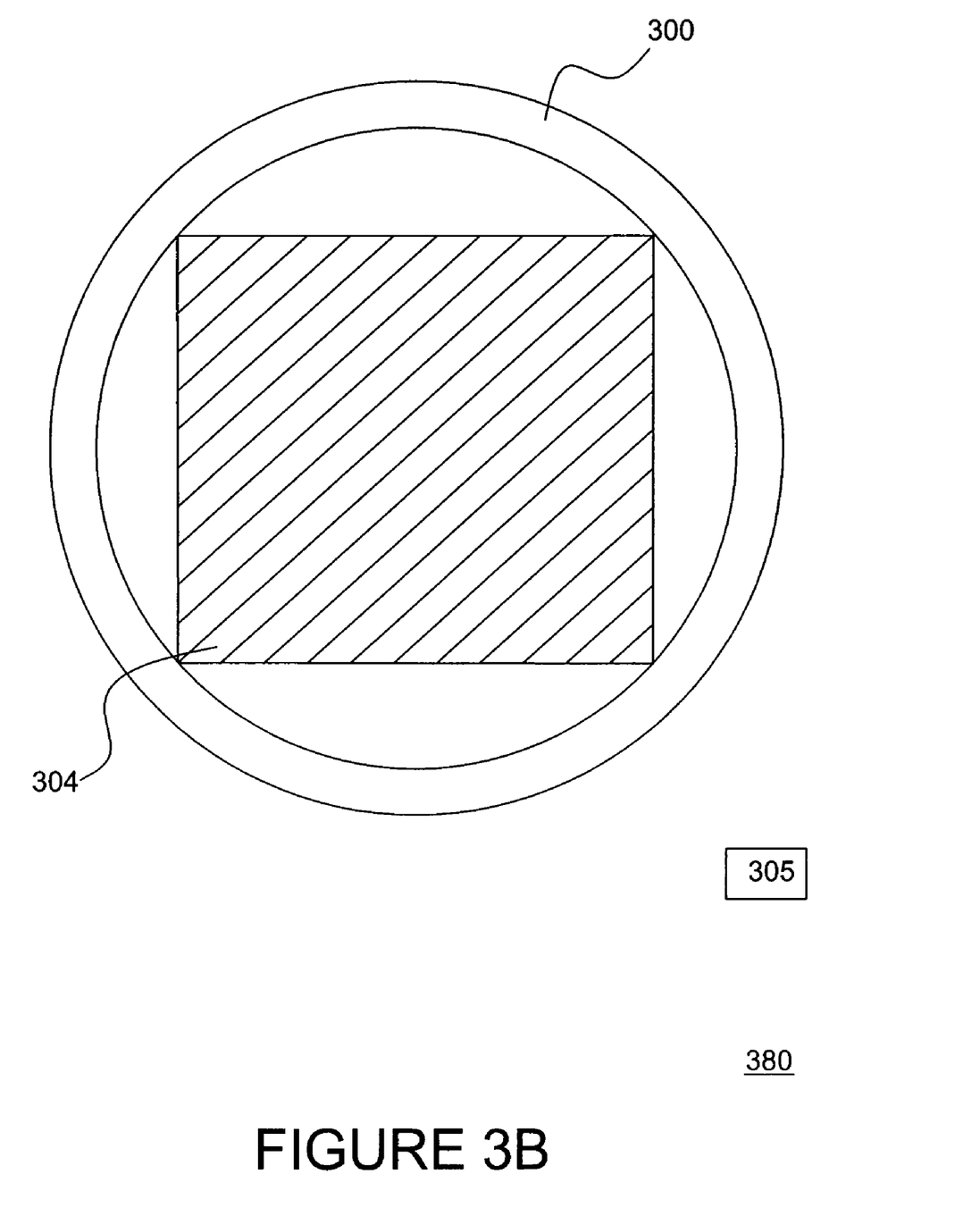
FIG. 3B is a schematic diagram showing an apparatus for detecting position arranged with a rectangular screen according to one preferred embodiment of the present invention.

FIGS. 3A and 3B show touch panels 370 and 380 utilizing the apparatuses of the present invention for detecting position. In the embodiment shown in FIG. 3A, the apparatus 300 for detecting position is placed on a circular screen 302. The processor 305 can construct the corresponding relations between the positions on the surface of the screen 302 (or the positions of images shown on the screen) and the positions within the apparatus 300. Therefore, which portion shown on the screen is to be clicked or selected can be determined by obtaining the position of the object within the apparatus 300. In another embodiment, the apparatus 300 may work in conjunction with a noncircular screen 304. The present invention does not limit the shape of the screen 304, as long as the screen 304 is included within a range that the apparatus 300 can work. FIG. 3B depicts an embodiment in which the screen 304 is a rectangular screen.

The signal sources of the present invention may be, for example but not limit to, light signal sources (such as infrared signal sources), surface acoustic wave signal sources, or ultrasonic wave signal sources. However, any signal which does not interfere with images shown on the screen can be applied in the present invention.

Figure 4:
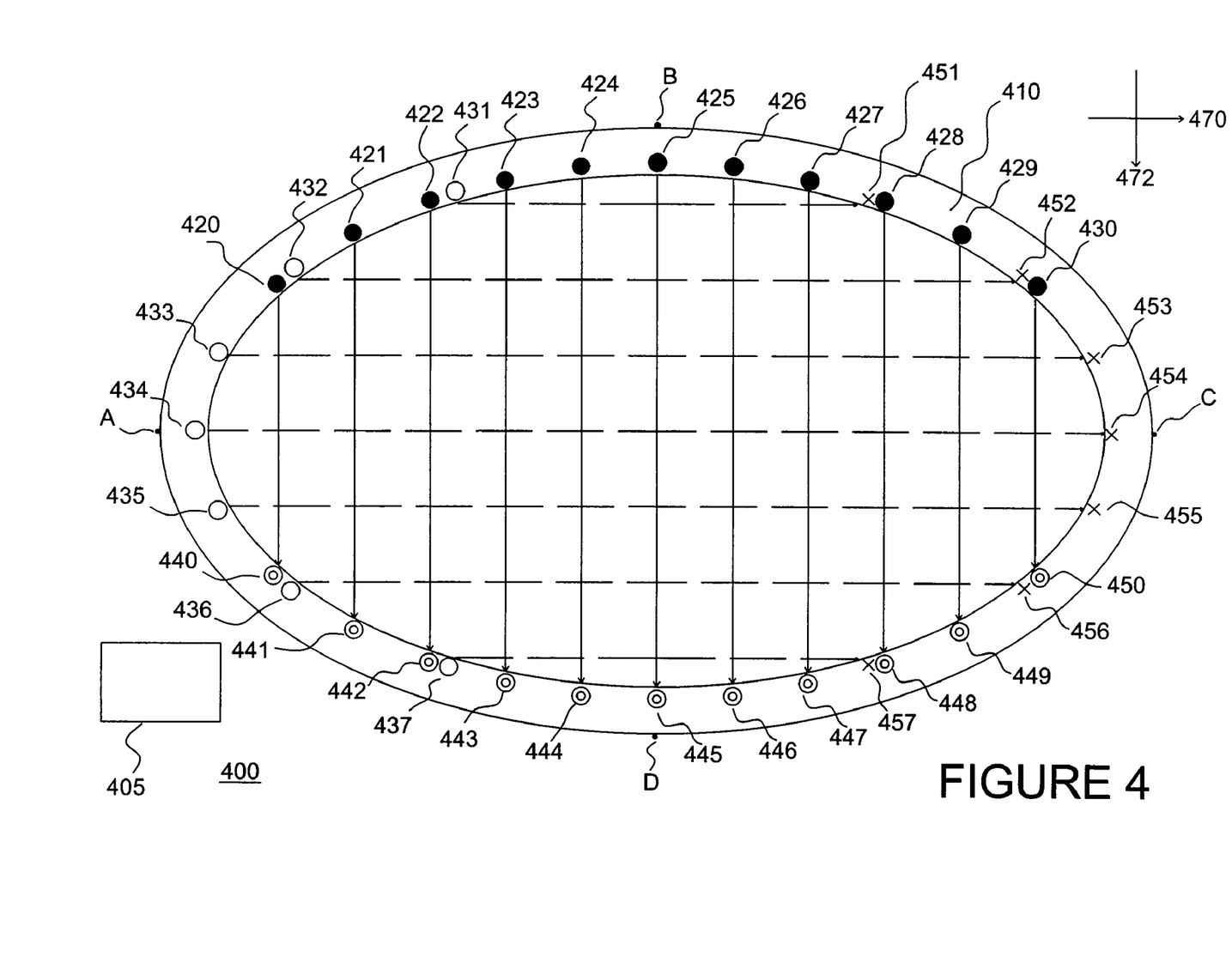
FIG. 4 is a schematic diagram showing an apparatus for detecting position according to another preferred embodiment of the present invention.

FIG. 4 shows an apparatus 400 for detecting position according to another preferred embodiment of the present invention. The apparatus 400 includes a processor 405, an elliptic frame 410, a first set of signal sources 420-430, a second set of signal sources 431-437, a first set of signal receivers 440-450, and a second set of signal receivers 451-457. The frame 410 is divided into four portions by the four points A, B, C, and D, namely, a first portion from point A to point B, a second portion from point B to point C, a third portion from point C to point D, and a fourth portion from point D to point A in a clockwise direction. The first set of signal sources 420-430 is disposed along the first and the second portions to emit signals for detecting a coordinate in a first direction 470, and the second set of signal sources 431-437 is disposed along the first and the fourth portions to emit signals for detecting a coordinate in a second direction 472 perpendicular to the first direction 470. The first set of signal receivers 440-450 is disposed along the third and the fourth portions for receiving signals from the first set of signal sources 420-430, and the second set of signal receivers 451-457 are disposed along the second and the third portions for receiving signals from the second set of signal sources 431-437.

The processor 405 is coupled to the first set of signal receivers 440-450 and the second set of signal receivers 451-457 indirectly for analyzing the strength of signals received by each receiver and then computing a position of an object within the frame 410. The work principles of each signal source, each signal receiver and the processor 405 shown in FIG. 4 are the same as that in FIG. 2A, so the details of these elements are omitted hereafter. As shown in FIG. 4, the number of the first set of signal sources is not necessarily the same as that of the second set of signal sources, and depends on the shape of the frame. One of the major features of the present invention lies in the condition that two sets of signal sources are interposed among each other, so do the corresponding two sets of signal receivers, wherein the signal sources and the signal receivers are respectively configured to emit and receive two sets of signals orthogonal to each other, and thus the plane coordinate of an object can be determined according to strength variation of signals received by the signal receivers.

Figure 5:
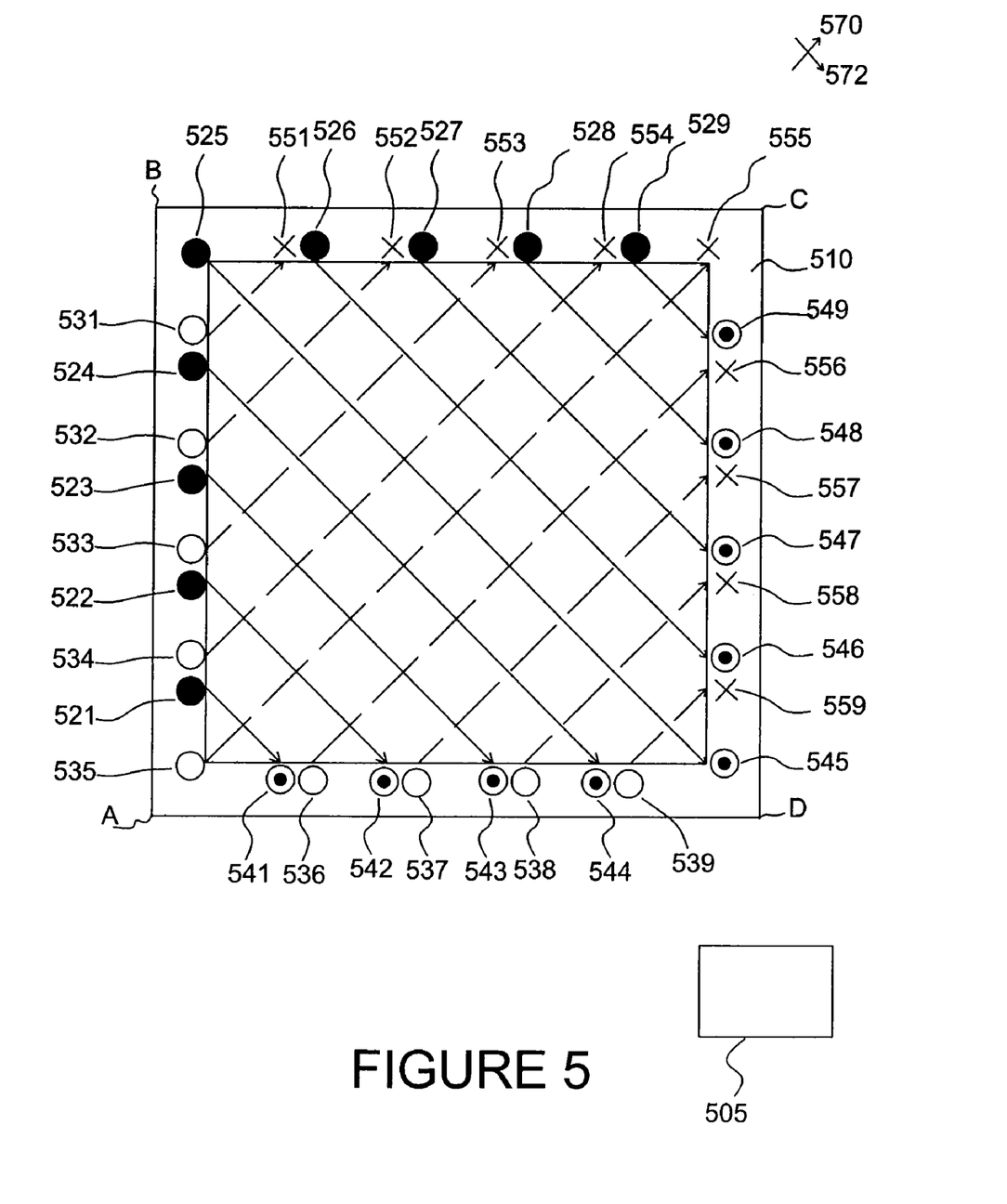
FIG. 5 is a schematic diagram showing an apparatus for detecting position according to still another preferred embodiment of the present invention.

As shown in FIG. 5, the present invention can also apply to a rectangular frame. In the embodiment shown in FIG. 5, the apparatus 500 for detecting position includes a processor 505, a rectangular frame 510, a first set of signal sources 521-529, a second set of signal sources 531-539, a first set of signal receivers 541-549, and a second set of signal receivers 551-559. The frame 510 is divided into four portions by the four points A, B, C, and D, namely, a first portion from point A to point B, a second portion from point B to point C, a third portion from point C to point D, and a fourth portion from point D to point A in a clockwise direction. The first set of signal sources 521-529 is disposed along the first and the second portions to emit signals for detecting a coordinate in a first direction 570, and the second set of signal sources 531-539 is disposed along the first and the fourth portions to emit signals for detecting a coordinate in a second direction 572 perpendicular to the first direction 570. The processor 505 is coupled to the first set of signal receivers 541-549 and the second set of signal receivers 551-559 indirectly, and determines a coordinate of the object in the first direction 570 according to the strength variation of the signals received by the first set of signal receivers 541-549 and a coordinate of the object in the second direction 572 according to the strength variation of the signals received by the second set of signal receivers 551-559.

Figure 6A:
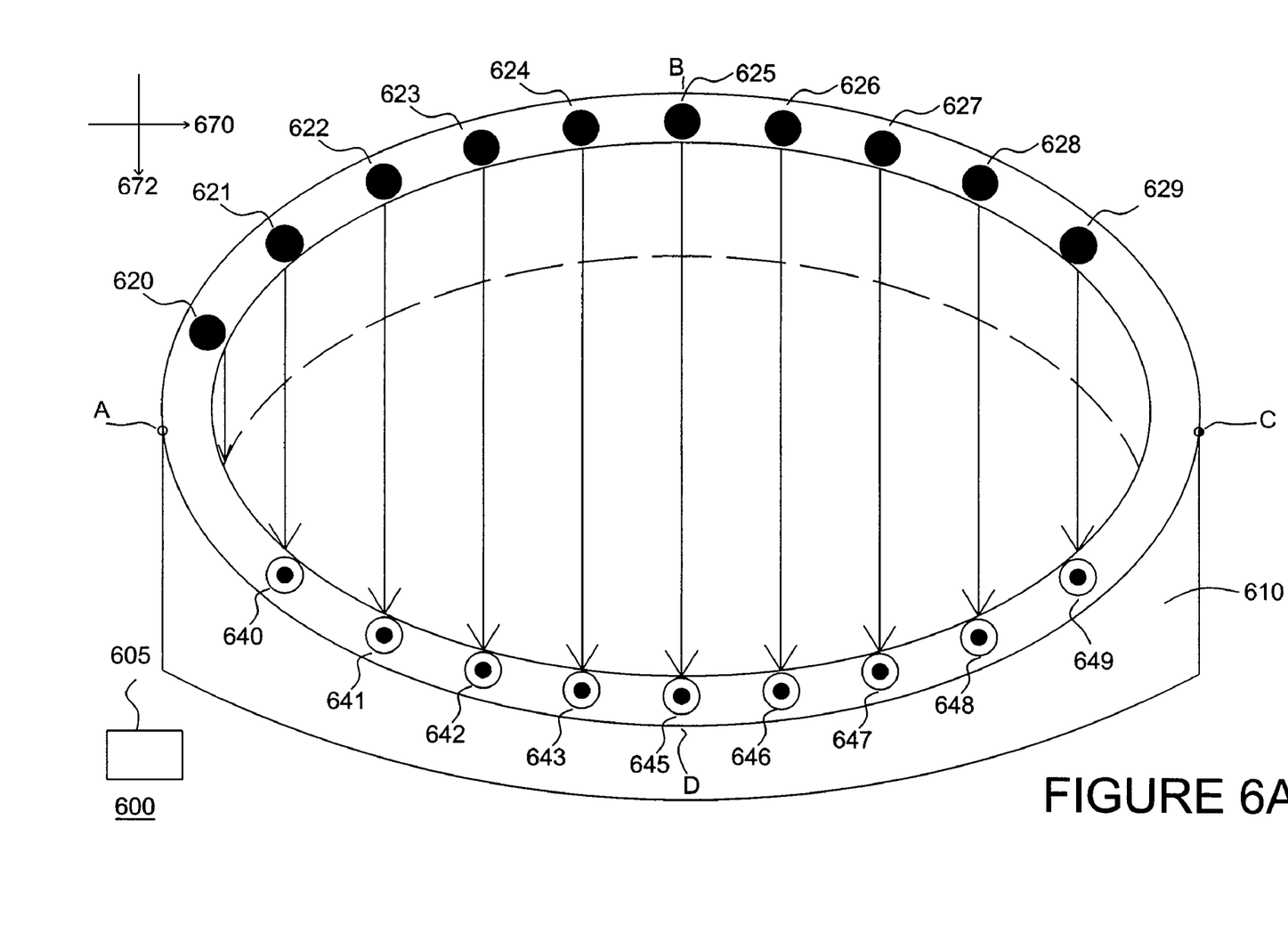
FIG. 6A is a perspective top view showing an apparatus for detecting position according to yet another preferred embodiment of the present invention.
Figure 6B:
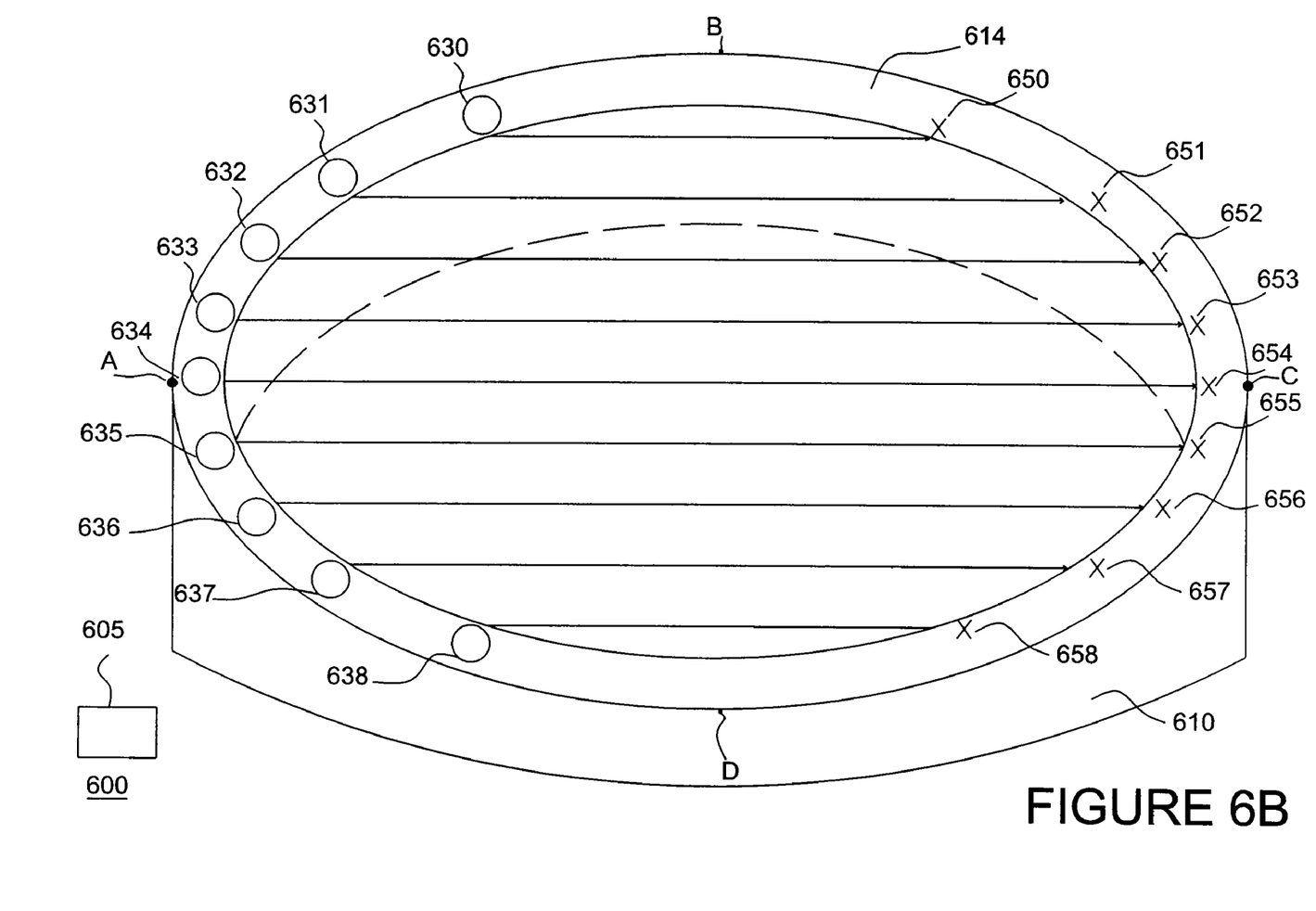
FIG. 6B is a perspective bottom view showing the apparatus for detecting position according to a still further preferred embodiment of the present invention.

FIGS. 6A and 6B show an apparatus 600 for detecting position including a frame 610 of an irregular shape according to another preferred embodiment of the present invention. For better understanding, FIGS. 6A and 6B are perspective views, in which FIG. 6A is a perspective top view and FIG. 6B is a perspective bottom view. The apparatus 600 includes a processor 605, a frame 610, a first set of signal sources 620-629, a second set of signal sources 630-638, a first set of signal receivers 640-649, and a second set of signal receivers 650-658. The frame 610 has an upper surface 612 and a lower surface 614, and is divided into four portions by the four points A, B, C, and D, namely, a first portion from point A to point B, a second portion from point B to point C, a third portion from point C to point D, and a fourth portion from point D to point A in a clockwise direction. The first set of signal sources 620-629 is disposed on the upper surface 612 of the first and the second portions to emit signals for detecting a coordinate in a first direction 670, and the second set of signal sources 630-638 is disposed on the lower surface 614 of the first and the fourth portions to emit signals for detecting a coordinate in a second direction 672. The first set of signal receivers 640-649 corresponding to the first set of signal sources 620-629 is disposed on the upper surface 612 of the third and the fourth portions, and the second set of signal receivers 650-658 corresponding to the second set of signal sources 630-638 is disposed on the lower surface 614 of the second and the third portions.

The processor 605 is coupled to the signal receivers 640-649 and 650-658 indirectly for computing a position of an object within the frame 610 through analyzing the signals received by the receivers. Generally, the apparatus in FIGS. 6A and 6B can be placed on a screen to implement a touch panel. When an object, such as a finger, is placed within the frame 610 and therefore touches the screen, a portion of signals emitted from the first set of signal sources 620-629 and a portion of signals emitted from the second set of signal sources 630-638 will be blocked concurrently. Additionally, the processor 605 can construct the corresponding relations between the positions on the surface of the screen (or the positions of images shown on the screen) and the positions within the frame 610. By analyzing the signals received by each signal receiver, the processor 605 can determine the coordinate of the object within the frame 610 and then determine which portion shown on the screen is to be clicked or selected by the object.

According to the present invention, the first set of signal sources and receivers and the second set of signal sources and receivers are to be disposed on two different horizontal planes respectively, but not limited to the upper and lower surfaces of the frame. For example, all the signal sources and signal receivers may be disposed on an inner wall of the frame, wherein the first set of signal sources and the first set of receivers are disposed on a first horizontal plane, and the second set of signal sources and the second set of receivers are disposed on a second horizontal plane at a distance from the first horizontal plane.

Figure 7:
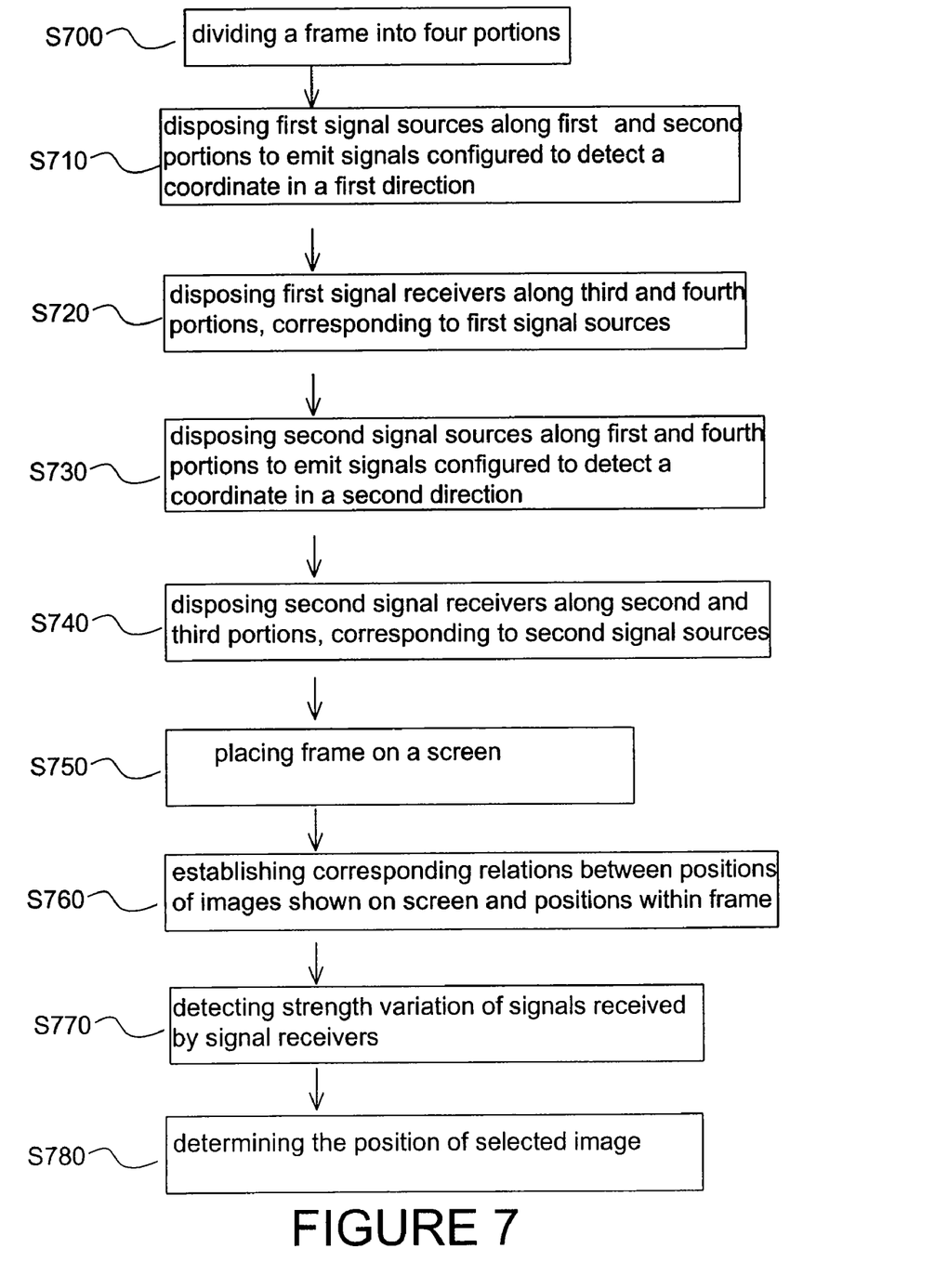
FIG. 7 is a flow chart of a method according to one embodiment of the present invention.

FIG. 7 is a flow chart of a method according to one embodiment of the present invention. The method is applied to the aforementioned apparatus and the touch panel of the present invention. First, in step S700, a frame is divided into a first portion, a second portion, a third portion, and a fourth portion. The scheme of the division depends on the shape of the frame, in which the combination of the first and the second portions is generally roughly symmetric to the combination of the third and the fourth portions, and the combination of the first and the fourth portions is generally roughly symmetric to the combination of the second and the third portions. In step S710, a plurality of first signal sources are disposed along the first and the second portions to emit the signals configured to detect a coordinate in a first direction, in which the emitted signal is generally in a direction perpendicular to the first direction. In step S720, a plurality of first signal receivers are disposed along the third and the fourth portions, corresponding to the first signal sources, to receive the signals from the plurality of first signal sources respectively. Next, in step S730, a plurality of second signal sources are disposed along the first and the fourth portions to emit the signals configured to detect a coordinate in a second direction perpendicular to the first direction. In step S740, a plurality of second signal receivers are disposed along the second and the third portions, corresponding to the second signal sources, to receive the signals from the plurality of second signal sources respectively.

Subsequently, in step S750, the frame is placed on the screen. The screen is configured to show images. In step S760, the corresponding relations between the positions of images shown on the screen and the positions within the frame are established. In step S770, the strength variation of the signals received by the signal receivers are detected for determining which signal receivers have decreased signal strength and the locations of these signal receivers. In step S780, two sets of lines can be formed according to the locations of the signal receivers and their corresponding signal sources, which are determined in the step S770, and then the position of the object within the frame can be determined in accordance with the intersections of these two sets of lines, and furthermore, which portion of the image shown on the screen is to be clicked or selected can be determined. The steps S760-S780 may be implemented through a particular algorithm performed by the processor, wherein the algorithm may be designed by persons skilled in the art, and such designs are generally known and thus would not be described in detail herein.

The above description is only for the preferred embodiments of the present invention and not to limit the scope of the invention. Any other equivalent changes or modifications without departing from the spirit disclosed by the present invention should be included in the appended claims.

We claim:

1. An apparatus for detecting position, comprising:
 a frame comprising a first portion, a second portion, a third portion, and a fourth portion, wherein the first portion, the second portion, the third portion, and the fourth portion are different from each other;
 a plurality of first signal sources disposed along said first and said second portions, said plurality of first signal sources emitting signals configured to detect a coordinate in a first direction;
 a plurality of first signal receivers disposed along said third and said fourth portions and corresponding to said plurality of first signal sources, said plurality of first signal receivers configured to receive signals from said plurality of first signal sources respectively;
 a plurality of second signal sources disposed along said first and said fourth portions, said plurality of second signal sources emitting signals configured to detect a coordinate in a second direction, wherein a portion of said plurality of second signal sources and a portion of said plurality of first signal sources are interposed among each other at said first portion, and a portion of said plurality of second signal sources and a portion of said plurality of first signal receivers are interposed among each other at said fourth portion;
 a plurality of second signal receivers disposed along said second and said third portions and corresponding to said plurality of second signal sources, said plurality of second signal receivers configured to receive signals from said plurality of second signal sources respectively, wherein a portion of said plurality of second signal receivers and a portion of said plurality of first signal sources are interposed among each other at said second portion, and a portion of said plurality of second signal receivers and a portion of said plurality of first signal receivers are interposed among each other at said third portion; and
 a processor coupled with said first and said second signal receivers, wherein when an object is set in a position within said frame, said processor determines said position of said object according to locations of said first and said second signal receivers and strength variation of signals received by said first and said second signal receivers.

2. The apparatus according to claim 1, wherein said first signal sources and said second signal sources are interposed among each other at said first portion, said first signal sources and said second signal receivers are interposed among each other at said second portion, said first signal receivers and said second signal receivers are interposed among each other at said third portion, and said first signal receivers and said second signal sources are interposed among each other at said fourth portion depending on a shape and a resolution of said apparatus.

3. The apparatus according to claim 1, wherein said first direction is vertical to said second direction.

4. The apparatus according to claim 1, wherein said apparatus is placed on a screen of a display, said screen configured to show images, wherein said processor establishes corresponding relations between positions of images shown on said screen and positions within said frame.

5. The apparatus according to claim 1, wherein said first and said second signal sources are infrared signal sources, surface acoustic wave signal sources, or ultrasonic wave signal sources.

6. The apparatus according to claim 1, wherein said frame is a circular frame.

7. The apparatus according to claim 1, wherein said frame is an elliptic frame.

8. The apparatus according to claim 1, wherein said frame is a rectangular frame.

9. The apparatus according to claim 1, wherein said plurality of first signal sources and said plurality of first signal receivers are disposed on a first horizontal plane, and said plurality of second signal sources and said plurality of second signal receivers are disposed on a second horizontal plane.

10. The apparatus according to claim 9, wherein said first horizontal plane is at a distance from said second horizontal plane, and a thickness of said object is larger than said distance.

11. The apparatus according to claim 1, wherein said first signal sources, said second signal sources, said first signal receivers, and said second signal receivers are not interposed in a one-to-one relation.

12. A touch panel comprising a screen, an apparatus for detecting position, and a processor, wherein said screen is configured to show images, said processor is configured to establish corresponding relations between positions of images shown on said screen and positions within a frame, and said apparatus is placed on said screen and comprises:
    said frame comprising a first portion, a second portion, a third portion, and a fourth portion, wherein the first portion, the second portion, the third portion, and the fourth portion are different from each other;
    a plurality of first signal sources disposed along said first and said second portions, said plurality of first signal sources emitting signals configured to detect a coordinate in a first direction;
    a plurality of first signal receivers coupled to said processor, and disposed along said third and said fourth portions and corresponding to said plurality of first signal sources, said plurality of first signal receivers configured to receive signals from said plurality of first signal sources respectively;
    a plurality of second signal sources disposed along said first and said fourth portions, said plurality of second signal sources emitting signals configured to detect a coordinate in a second direction, wherein a portion of said plurality of second signal sources and a portion of said plurality of first signal sources are interposed among each other at said first portion, and a portion of said plurality of second signal sources and a portion of said plurality of first signal receivers are interposed among each other at said fourth portion; and
    a plurality of second signal receivers coupled to said processor, and disposed along said second and said third portions and corresponding to said plurality of second signal sources, said plurality of second signal receivers configured to receive signals from said plurality of second signal sources respectively, wherein a portion of said plurality of second signal receivers and a portion of said plurality of first signal sources are interposed among each other at said second portion, and a portion of said plurality of second signal receivers and a portion of said plurality of first signal receivers are interposed among each other at said third portion;

wherein when an object is set in a position within said frame, said processor determines said position of said object according to locations of said first and said second signal receivers and strength variation of signals received by said first and said second signal receivers.

13. The touch panel according to claim 12, wherein said first signal sources and said second signal sources are interposed among each other at said first portion depending on a shape and a resolution of said apparatus.

14. The touch panel according to claim 12, wherein said first direction is vertical to said second direction.

15. The touch panel according to claim 12, wherein said first and said second signal sources are infrared signal sources, surface acoustic wave signal sources, or ultrasonic wave signal sources.

16. The touch panel according to claim 12, wherein said frame is a circular frame.

17. The touch panel according to claim 12, wherein said frame is an elliptic frame.

18. The touch panel according to claim 12, wherein said frame is a rectangular frame.

19. The touch panel according to claim 12, wherein said plurality of first signal sources and said plurality of first signal receivers are disposed on a first horizontal plane, and said plurality of second signal sources and said plurality of second signal receivers are disposed on a second horizontal plane.

20. The touch panel according to claim 19, wherein said first horizontal plane is at a distance from said second horizontal plane, and a thickness of said object is larger than said distance.

21. The touch panel according to claim 12, wherein said first signal sources, said second signal sources, said first signal receivers, and said second signal receivers are not interposed in a one-to-one relation.

22. A method for determining a position of an object within a frame, said frame comprising of a first portion, a second portion, a third portion, and a fourth portion, wherein the first portion, the second portion, the third portion, and the fourth portion are different from each other, said method comprising the following steps:
    disposing a plurality of first signal sources along said first and said second portions to emit signals for detecting a coordinate in a first direction;
    disposing a plurality of first signal receivers along said third and said fourth portions to receive signals from said plurality of first signal sources respectively;
    disposing a plurality of second signal sources along said first and said fourth portions to emit signals for detecting a coordinate in a second direction, wherein a portion of said plurality of second signal sources and a portion of said plurality of first signal sources are interposed among each other at said first portion, and a portion of said plurality of second signal sources and a portion of said plurality of first signal receivers are interposed among each other at said fourth portion;
    disposing a plurality of second signal receivers along said second and said third portions to receive signals from said plurality of second signal sources respectively, wherein a portion of said plurality of second signal receivers and a portion of said plurality of first signal sources are interposed among each other at said second portion, and a portion of said plurality of second signal receivers and a portion of said plurality of first signal receivers are interposed among each other at said third portion; and
    determining said position of said object according to locations of said first and said second signal receivers and strength variation of signals received by said first and said second signal receivers.

23. The method according to claim 22, wherein said first signal sources and said second signal sources disposed along said first portion are interposed among each other depending on a shape and a resolution of said apparatus.

24. The method according to claim 22, wherein said first direction is vertical to said second direction.

25. The method according to claim 22, wherein said first and said second signal sources are infrared signal sources, surface acoustic wave signal sources, or ultrasonic wave signal sources.

26. The method according to claim 22, wherein said frame is a circular frame.

27. The method according to claim 22, wherein said frame is an elliptic frame.

28. The method according to claim 22, wherein said frame is a rectangular frame.

29. The method according to claim 22, wherein said plurality of first signal sources and said plurality of first signal receivers are disposed on a first horizontal plane, and said plurality of second signal sources and said plurality of second signal receivers are disposed on a second horizontal plane.

30. The method according to claim 29, wherein said first horizontal plane is at a distance from said second horizontal plane, and a thickness of said object is larger than said distance.

31. The method according to claim 22, further comprising the following steps:
   placing said frame on a screen of a display, said screen configured to show images; and
   establishing corresponding relations between positions of images shown on said screen and positions within said frame.

32. The method according to claim 22, wherein said first signal sources, said second signal sources, said first signal receivers, and said second signal receivers are not interposed in a one-to-one relation.

* * * * *

UNITED STATES PATENT AND TRADEMARK OFFICE
CERTIFICATE OF CORRECTION

PATENT NO. : 7,864,165 B2  
APPLICATION NO. : 11/753237  
DATED : January 4, 2011  
INVENTOR(S) : Yeh et al.

Page 1 of 1

It is certified that error appears in the above-identified patent and that said Letters Patent is hereby corrected as shown below:

Title Page

(12) Delete "Weh" and insert --Yeh--.

(75) Inventors Delete "Shang Tai Weh" and insert --Shang Tai Yeh--.

Signed and Sealed this
Eighth Day of July, 2014

Michelle K. Lee
*Deputy Director of the United States Patent and Trademark Office*